(12) United States Patent
Daniel et al.

(10) Patent No.: US 7,642,645 B2
(45) Date of Patent: Jan. 5, 2010

(54) SYSTEMS AND METHODS FOR ALIGNING WAFERS OR SUBSTRATES

(75) Inventors: Jurgen H. Daniel, Mountain View, CA (US); Lars-Erik Swartz, Sunnyvale, CA (US)

(73) Assignee: Palo Alto Research Center Incorporated, Norwalk, CT (US)

( * ) Notice: Subject to any disclaimer, the term of this patent is extended or adjusted under 35 U.S.C. 154(b) by 404 days.

(21) Appl. No.: 10/954,201

(22) Filed: Oct. 1, 2004

(65) Prior Publication Data
US 2006/0070226 A1 Apr. 6, 2006

(51) Int. Cl.
*H01L 23/34* (2006.01)
(52) U.S. Cl. .......... 257/723; 257/680; 257/724; 257/797; 257/E23.179; 438/107; 438/401
(58) Field of Classification Search ............ 257/797, 257/E23.179, 680, 723, 724; 438/401, 462, 438/107; 29/464; 361/786
See application file for complete search history.

(56) References Cited
U.S. PATENT DOCUMENTS
5,709,958 A * 1/1998 Toyoda et al. .............. 428/620
5,753,536 A * 5/1998 Sugiyama et al. ........... 438/108
6,085,967 A * 7/2000 Grande et al. .............. 228/212
6,093,961 A * 7/2000 McCullough .............. 257/718
6,393,685 B1 5/2002 Collins

OTHER PUBLICATIONS

L.S. Huang et al.; "Self-Assembled Microslider for Microjoinery"; Mechanical and Aerospace Engineering Dept University of California.

* cited by examiner

*Primary Examiner*—Matthew E Warren
*Assistant Examiner*—John Lin
(74) *Attorney, Agent, or Firm*—Oliff & Berridge, PLC (57) ABSTRACT

Systems and methods for aligning substrates that include microstructures. The microstructures may be electronic or micromechanical components. The system includes a first substrate having a first alignment structure and a second substrate having a second alignment structure. The substrates are positioned so that the first alignment structure contacts the second alignment structure without the substrates directly contacting each other, and one of the substrates is adjusted in relation to the other substrate until the first and second alignment structures lock into place. After alignment, the microstructures on the first substrate and the second substrate may establish a connection with or be positioned in near proximity to each other.

20 Claims, 9 Drawing Sheets

FIG. 9

SYSTEMS AND METHODS FOR ALIGNING WAFERS OR SUBSTRATES

BACKGROUND OF THE INVENTION

1. Field of Invention

The invention relates to systems and methods for aligning wafers or substrates. More specifically, the invention relates to systems and methods that align wafers or substrates that include microstructures or microcomponents.

2. Description of Related Art

During the arrangement of microstructures, a process may require that at least two substrates or wafers be aligned to each other so that the microstructures on the substrates are accurately aligned. The microstructures may be active or passive microstructures including electronic or micromechanical components. The substrates may include microcomponents, or microoptical or micro-electro-mechanical system (MEMS) devices. The MEMS devices may include accelerometers, gyroscopes, pressure sensors, and micromirrors. The substrates may be patterned with electronic devices such as transistors, inductors and sensors, or patterned with simple microstructures such as conducting lines or other geometries. The microoptical devices may include lasers, light-emitting-diodes, mirrors or lenses. Microchannels, fiber-clips and CLAW(ClawConnect™)-type contact springs may also be included on the substrates. Large substrates sometimes have to be aligned during an assembly, for example, of an image sensor array or display.

With conventional methods, most of the alignment of the substrates or wafers is performed optically with an x-y alignment stage. For example, the alignment may be performed by optical alignment with x-y stages and alignment marks. With this process, a calibration mask pattern and calibration wafer test pattern may include checkerboard-like arrays of mutually orthogonal (x-oriented and y-oriented) periodic gratings which are frequency matched to each other in the wafer plane, e.g., the image plane of the mask. The wafer test pattern may be carried by a die at the center of the wafer and by opposing radially displaced dies which align with the x-axis and the y-axis of the exposure tool, thereby enabling measurement of overlay air at various locations on the wafer.

MEMS fabrication technology is conventionally employed to align or join structures or substrates. Anisotropic etching of silicon is used to form optical benches. Moreover, Lithographie, Galvanoformung, Abformtechnik (LIGA) structures, (e.g., formed by X-ray lithography, electroplating, molding) are used to make connectors and to align optical components. These systems also align the components using x-y stages and alignment marks.

If an alignment process is required for substrates used with micro-optics or MEMS packaging, special tools or sophisticated optical systems are required for the alignment process. These areas may include assembly of displays or image sensors where the large area substrates must be aligned, e.g., the alignment of X-ray conversion screens or color phosphor screens to the pixels.

Figure 1:
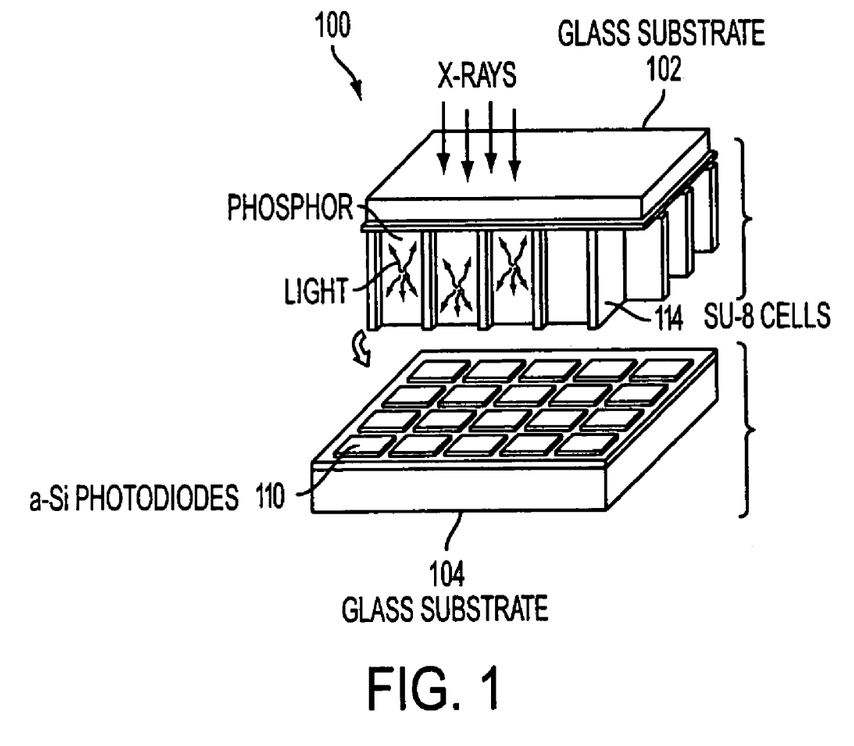
FIG. 1 is an exemplary diagram of substrates that require alignment.
Figure 2:
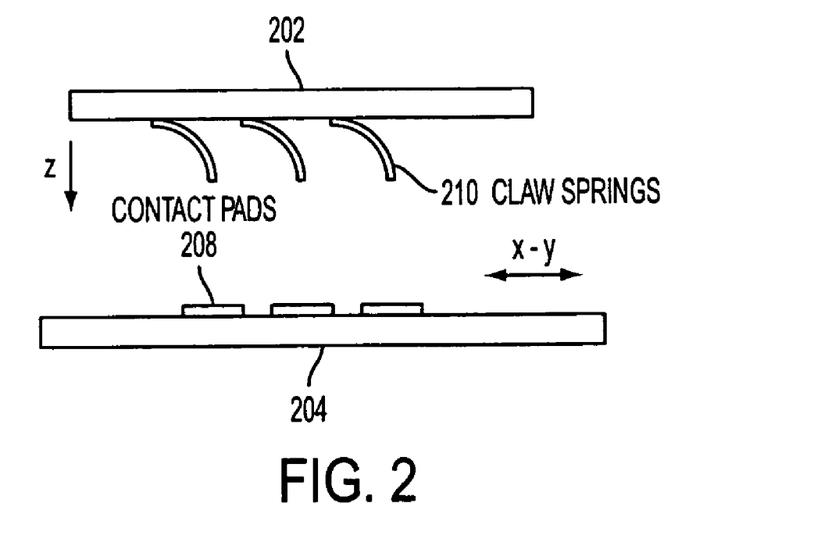
FIG. 2 is a second exemplary diagram of substrates that require alignment.

As shown in FIG. 1, and in order to fabricate, for example, an X-ray imager, a wafer 104 with the imager electronics, e.g., pixels 110, has to be aligned to a micro-patterned X-ray conversion screen 100. The alignment has to be precise so that each pixel 100 on the image sensor array matches a cell on the X-ray conversion screen 100. As shown in FIG. 2, CLAW springs 210 may be positioned on an upper substrate 202 and electrical contact pads 208 may be positioned on a lower substrate 204. After alignment of the two substrates 202 and 204, the upper substrate 202 may be lowered (and the lower substrate 204 may be adjusted in the x-y direction) so that an electrical connection is established between the CLAW springs 210 and the contact pads 208. The alignment accuracy may depend on the size of the CLAW spring 210 and the size of the contact pad 208. Using the conventional systems and methods, it is difficult to achieve an accurate alignment of the upper substrate 202 with the CLAW springs 210 and the lower substrate 204 with the contact pads 208 so that the electrical components establish a good connection.

Because a special optical alignment table may be required, an accurate alignment can be difficult to achieve. Furthermore, the equipment used for alignment using the conventional devices discussed above may be rather expensive and the alignment procedure time-consuming. In many instances, after the alignment of the substrates, the substrates have to be held in place with an adhesive. Thus, it becomes impossible to test and rework the devices after the adhesive cures. Some applications may require frequent exchange of parts which makes the optical alignment steps impractical.

SUMMARY OF THE INVENTION

Based on the problems discussed above, the systems and methods of the invention accurately align wafers or substrates having the microstructures or micro components such as microoptical or MEMS devices. Two wafers may be aligned to each other using alignment structures formed on each wafer.

In various exemplary embodiments of the invention, a system for aligning substrates that include microstructures may include a first substrate having a first alignment structure and a first microstructure and a second substrate having a second alignment structure and a second microstructure. The first substrate is positioned to contact the first alignment structure with the second alignment structure without the substrates directly contacting each other, and at least one of the first and second substrates is adjusted in relation to the other substrate until the first and second alignment structures lock into place.

A method includes forming a first substrate that includes a first alignment structure and a first microstructure, and forming a second substrate that includes a second alignment structure and a second microstructure. The first substrate is positioned so that the first alignment structure contacts the second alignment structure of the second substrate without the two substrates contacting each other, and then at least one of the first and second substrates is adjusted in relation to the other substrate until the first alignment structure and the second alignment structure lock into place.

For example, two wafers may have alignment structures and microstructures formed on each wafer. The microstructures may include electronic, micromechanical, microoptical or MEMS devices. The alignment structures on each wafer may interlock and provide optimal alignment so that the microstructures establish a good connection or are positioned in near proximity to each other. The alignment structures may be patterned on both wafers by a photolithography process to provide increased accuracy when the wafers are aligned with each other.

In various exemplary embodiments of the invention, an alignment structure may include a layer on a lower substrate which prevents direct contact of an upper substrate with the surface of the lower substrate during the alignment process. This layer acting as an alignment structure may prevent damage caused during the alignment process, for example, preventing the X-ray conversion screen in FIG. 1 from scratching an imager surface on the lower substrate.

In various exemplary alternative embodiments of the invention, a second layer on a lower substrate may provide the alignment, and may contain springing or flexible structures to allow for tolerances. The second layer may also provide a passive guidance structure that makes the alignment easier and avoids the need for alignment optics, e.g., the x-y alignment stage.

In various exemplary alternative embodiments according to the invention, a top substrate formed in a predetermined shape, e.g., a circular or quadrilateral shape, may slide laterally or longitudinally into position within a lower substrate having a similar or different shape without scratching the electronics located on a lower substrate.

The various exemplary embodiments according to the invention may provide non-contact alignment to prevent damage that occurs during alignment, and may eliminate the need for special alignment tools or for fixing the aligned components with an adhesive.

BRIEF DESCRIPTION OF THE DRAWINGS

Various exemplary embodiments of the systems and methods according to the invention will be described in detail, with reference to the following figures, wherein.

DETAILED DESCRIPTION OF EXEMPLARY EMBODIMENTS

The invention relates to systems and methods for aligning wafers or substrates. For reasons of convenience, the examples below will be discussed using wafers or substrates as the devices requiring alignment. However, it should be appreciated by one skilled in the art that the systems and methods of the invention may be used with any known microstructure, including electronic or micromechanical devices, that require alignment without departing from the spirit and scope of the invention.

Figure 3:
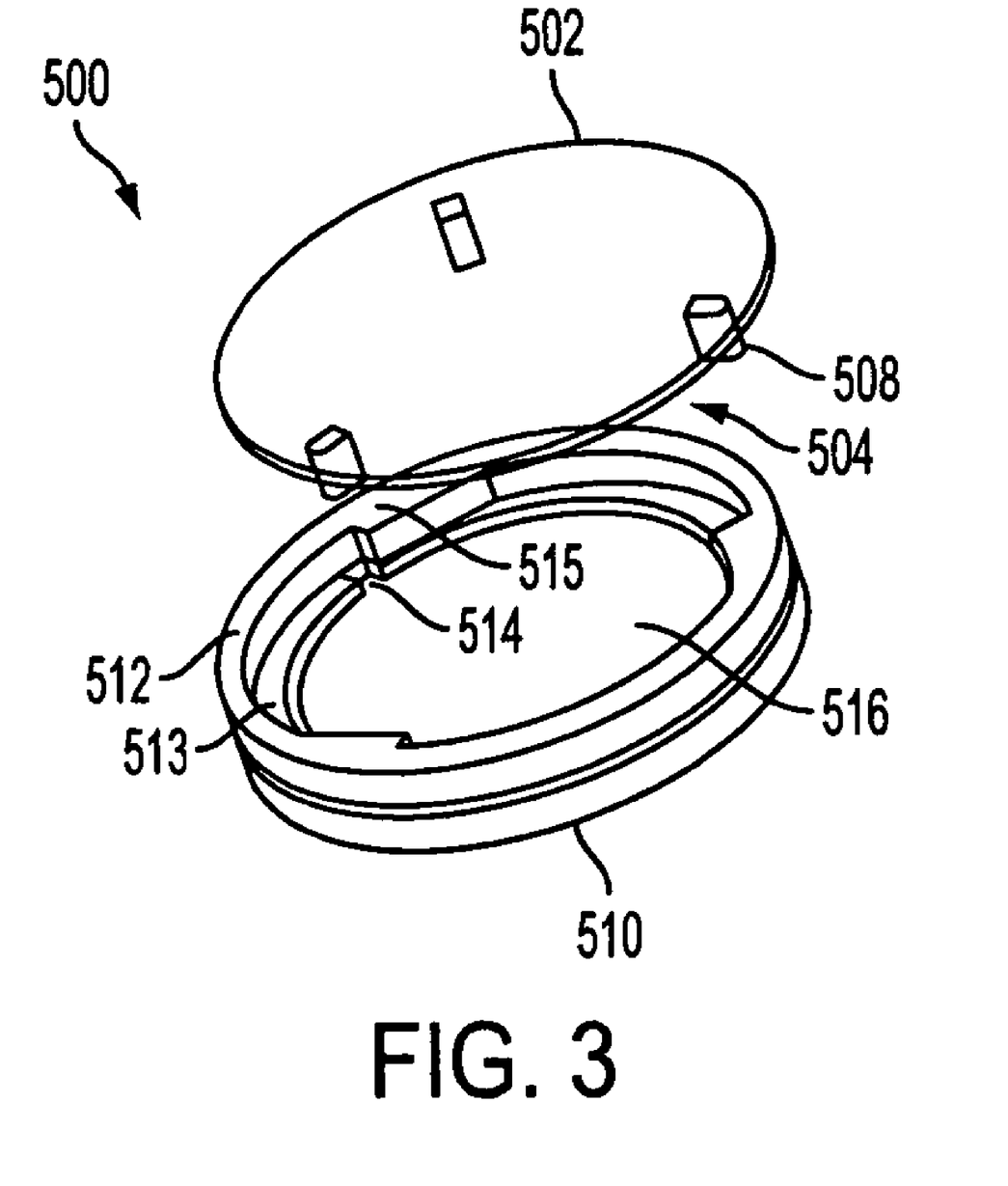
FIG. 3 is an exemplary diagram of alignment structures according to the invention.

FIGS. 3-4 show exemplary embodiments of substrates or wafers that align by "rotational alignment." As shown in FIG. 3, an upper substrate 502 may include alignment structures 508. The upper substrate 502 may be composed of a transparent material so that the structure of a lower substrate 510 may be viewed through the upper substrate 502. For example, the upper substrate 502 may be composed of glass with indium tin oxide (ITO) if a conductive substrate is needed. However, the upper substrate does not need to be formed of the transparent material for alignment to be performed. The lower substrate 510 may be formed to include various layers patterned, e.g., alignment structures, to facilitate the alignment of the substrates 502 and 510. For example, the lower substrate 510 may include a first layer 512 that has a radius that decreases as the layer 512 nears a keyhole structure 515. The lower substrate 510 may also include a second layer 513 and apertures 514 for aligning the substrates 502 and 510. The lower substrate 510 may include the microstructures or microcomponents discussed above, which may be positioned on its upper surface 516.

An alignment may be achieved by rotating both substrates 502 and 510 in relation to each other. The substrates 502 and 510 may be light enough so that the forces to move the substrates 502 and 510 are smaller than the forces required to damage the alignment structures 508. In order to reduce friction forces during the alignment, a lubricant may be added to the alignment structures 508 and surfaces. For example, the lubricant may be isopar, isopropanol or water which may evaporate after alignment is complete. Alternatively, the surfaces of each substrate 502 and 510 may be coated with a low-friction coating such as Teflon.

When alignment is required, the upper substrate 502, which may include the microstructures or microcomponents discussed above on its lower surface 504, is placed into the open area of the lower substrate 510 formed by the first layer 512. Once the upper substrate 502 is positioned inside the open area, the alignment structures 508 on the upper substrate 502 rest on the second layer 513 of the lower substrate 510. Next, in this example, the upper substrate 502 is rotated clockwise until the alignment structures 508 arrive at the apertures 514 formed in the second layer 513 of the lower substrate 510. The alignment structures 508 are then lowered into the apertures 514 so that they rest up against the keyhole structures 515. As the lower substrate 502 is lowered into the apertures 514 using the alignment structures 508, any microstructure located on the lower surface 504 of the upper substrate 502 may establish contact with or be positioned near any microstructure located on the upper surface 516 of the lower substrate 510. Because the alignment structures 508 rest on the second layer 513 of the lower substrate 510 while the rotation is being performed, there is no scratching or damaging of the surfaces containing the microstructures as the upper layer 502 is being rotated. Furthermore, because the apertures 514 and the keyhole structures 515 securely fasten the alignment structures 508 into place, any movement which might cause the structures to become out of alignment is minimized.

Figure 4A:
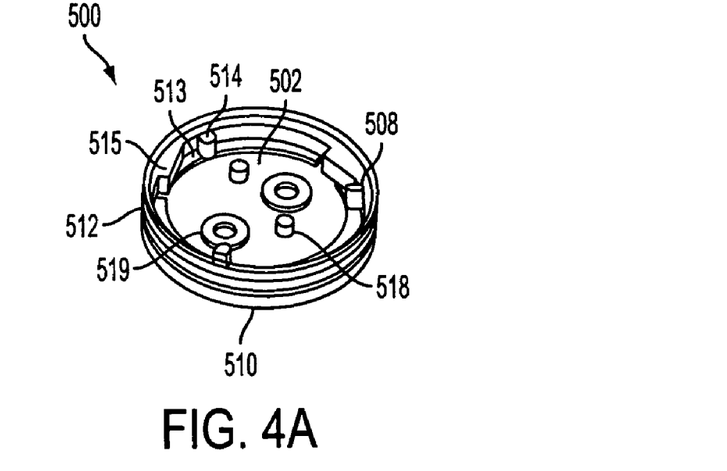
FIGS. 4A-G are exemplary diagrams showing alignment structures in accordance with another embodiment of the invention.
Figure 4B:
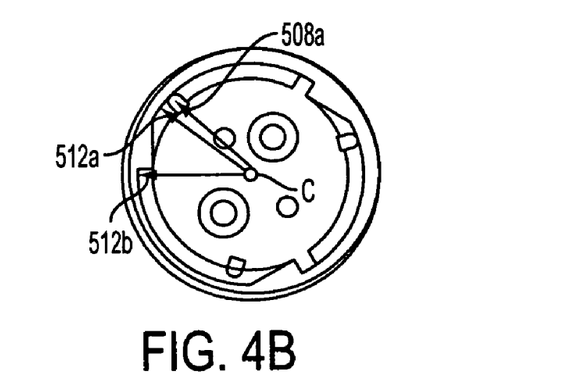

FIGS. 4A-G are exemplary diagrams showing aligned microstructures in accordance with another embodiment of the invention. In this embodiment, the upper and lower substrates 502 and 510 may include microstructures located within a central position. As shown in FIG. 4A, the upper substrate 502 may be composed of a transparent material and include a microstructure 518. The lower substrate 510 may also include a microstructure 519. The microstructures 518 and 519 may be various types of devices as discussed above, and also be different shapes and colors. As shown in FIG. 4B, the radius r1 from the center C of the upper substrate 502 to the edge 508a of the alignment structure 508 is smaller than radius R2 from the center C of the upper substrate 502 to the inner edge 512a of the first layer 512 of the second substrate 510. Thus, the upper substrate 502 fits easily into the open area of the lower substrate 510.

Figure 4C:
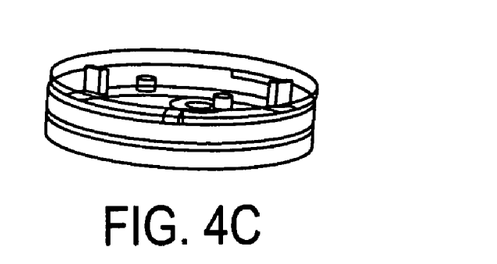
Figure 4D:
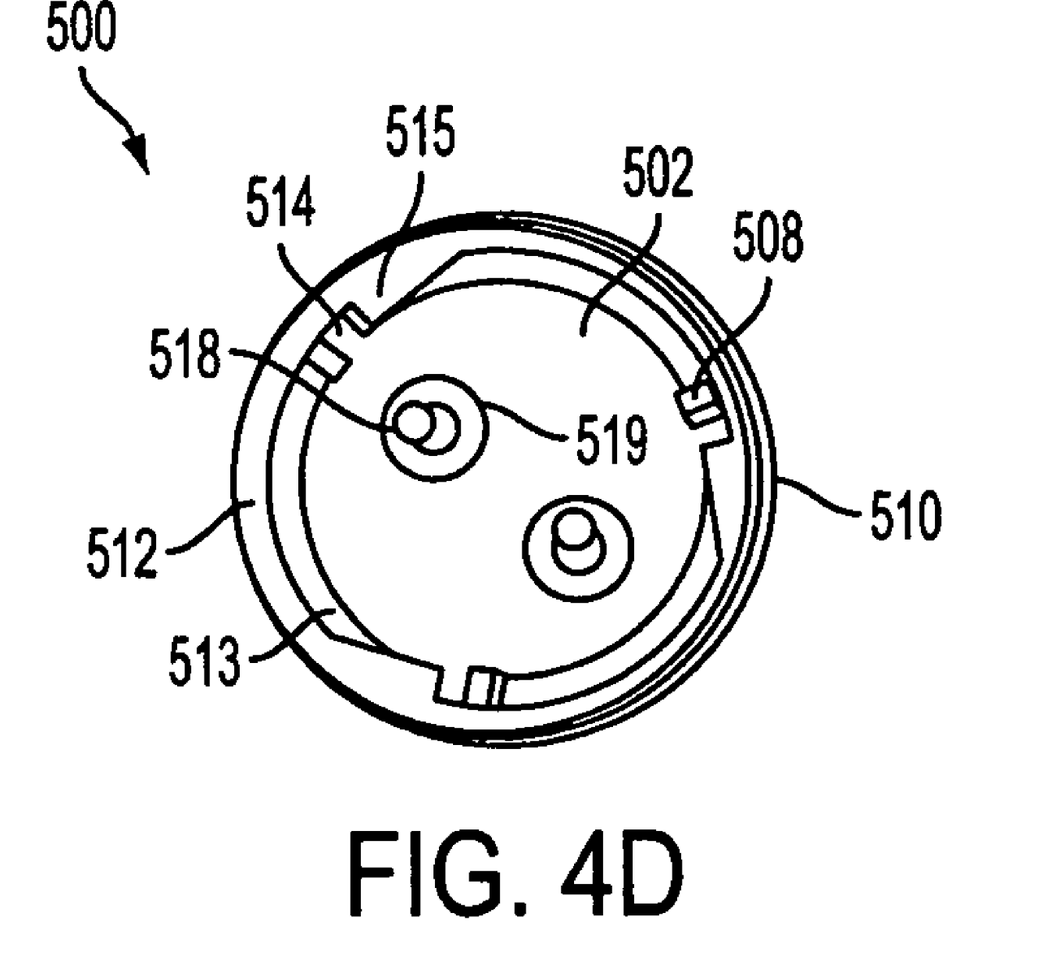
Figure 4E:
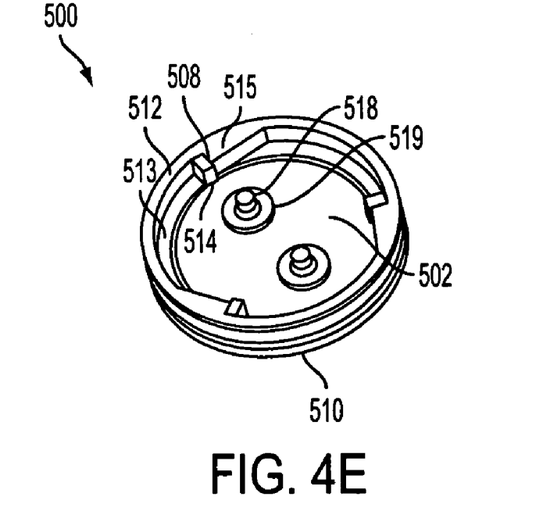
Figure 4F:
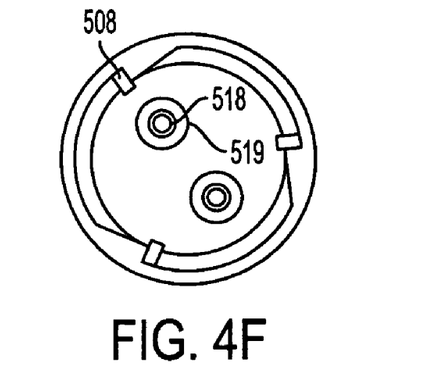
Figure 4G:
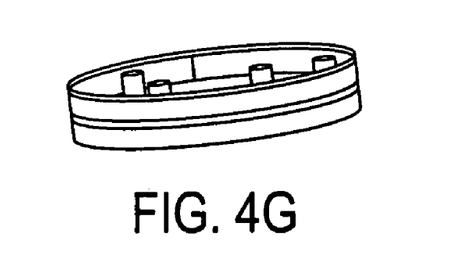

As discussed above, the upper substrate 502 is rotated clockwise in FIG. 4C to align the alignment structures 508 with the apertures 514 formed in the second layer 513 of the lower substrate 510. The radius R2 shown in FIG. 4B decreases until it reaches the radius R1 located on the inner edge 512b of the first layer 512. Thus, as the rotation occurs, the alignment becomes more accurate as shown in FIG. 4D. As shown in FIG. 4E, the alignment structures 508 are then lowered into the apertures 514 so that they rest up against the keyhole structures 515 and any microstructures located on the lower surface 504 of the upper substrate 502 may establish contact or be positioned in near proximity to microstructures located on the upper surface 516 of the lower substrate 510. As shown in FIG. 4F, the upper substrate 502 may be rotated until the microstructures 518 and 519 correspond to each other. In this example, alignment is complete when the microstructure 518 is centered within opening of the microstructure 519. A fully aligned device is shown in FIG. 4G. It should be appreciated that the alignment in this embodiment could also be performed by rotating the upper substrate 502 or lower substrate 510 in a counter-clockwise direction without departing from the spirit and scope of the invention.

Figure 5A:
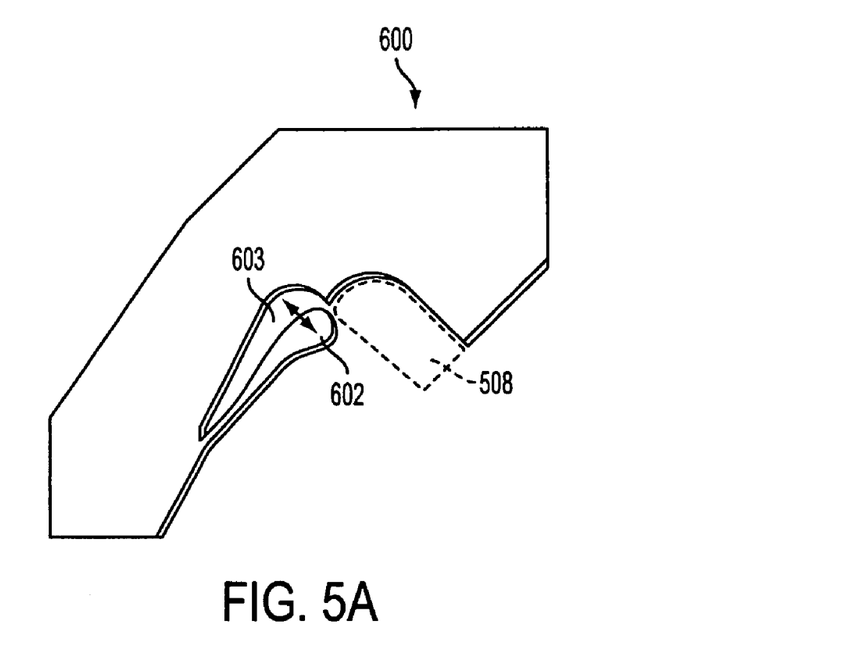
FIGS. 5A-B are exemplary diagrams showing a fastener that may be used in accordance with the invention.
Figure 5B:
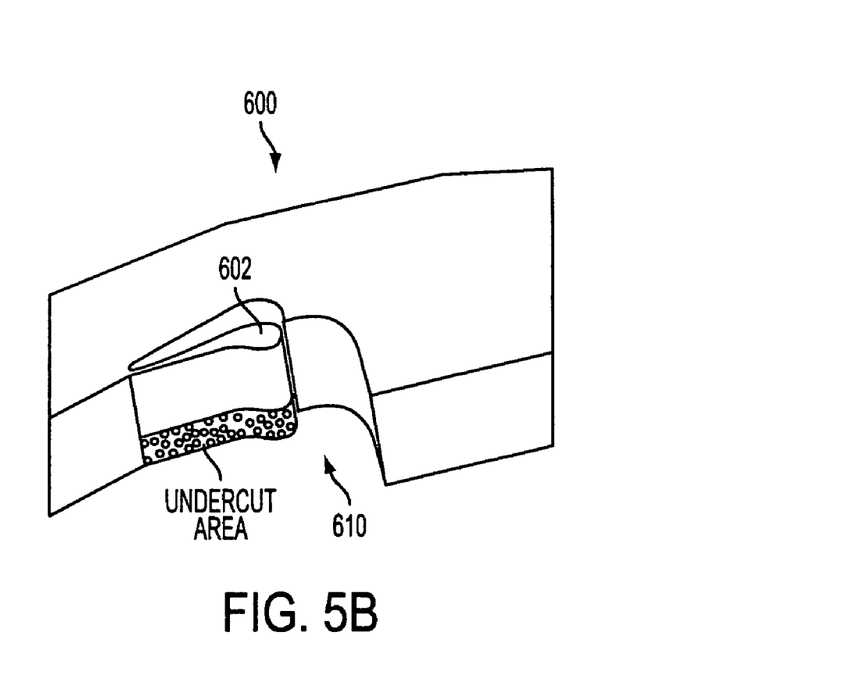

FIGS. 5A-B are exemplary diagrams showing a fastener that may be used in accordance with the invention. As shown in FIGS. 5A-B, the fastener 600 may be a clipping mechanism to fix (or temporarily fix) the aligned upper substrate 502 in place using the alignment structure 508. The fastener 600 may be formed of a metal or polymer material. A lever 602 may be included with the fastener which may flex backwards (shown by the arrows) with pressure and return to its equilibrium position when pressure is released. This action provides a spring force to the fastener 600. The lever 602 may be a moveable cantilever and suspended by including an undercut area shown in FIG. 5B. The undercut area may be formed by a strong reentrant profile, e.g., by only partially exposing the cantilever formation if a photopolymer is used. As discussed later with reference to FIG. 8, a sacrificial layer underneath the cantilever formation may also be used for forming a suspended cantilever. As shown in FIG. 5A, when the alignment structure 508 on the upper substrate 502 passes by the lever 602 during alignment, pressure causes the moveable lever 602 to retract into an open area 603. After the alignment structure 508 reaches a position past the lever 602, the lever returns back into its equilibrium position and locks the alignment structure into place.

Figure 6A:
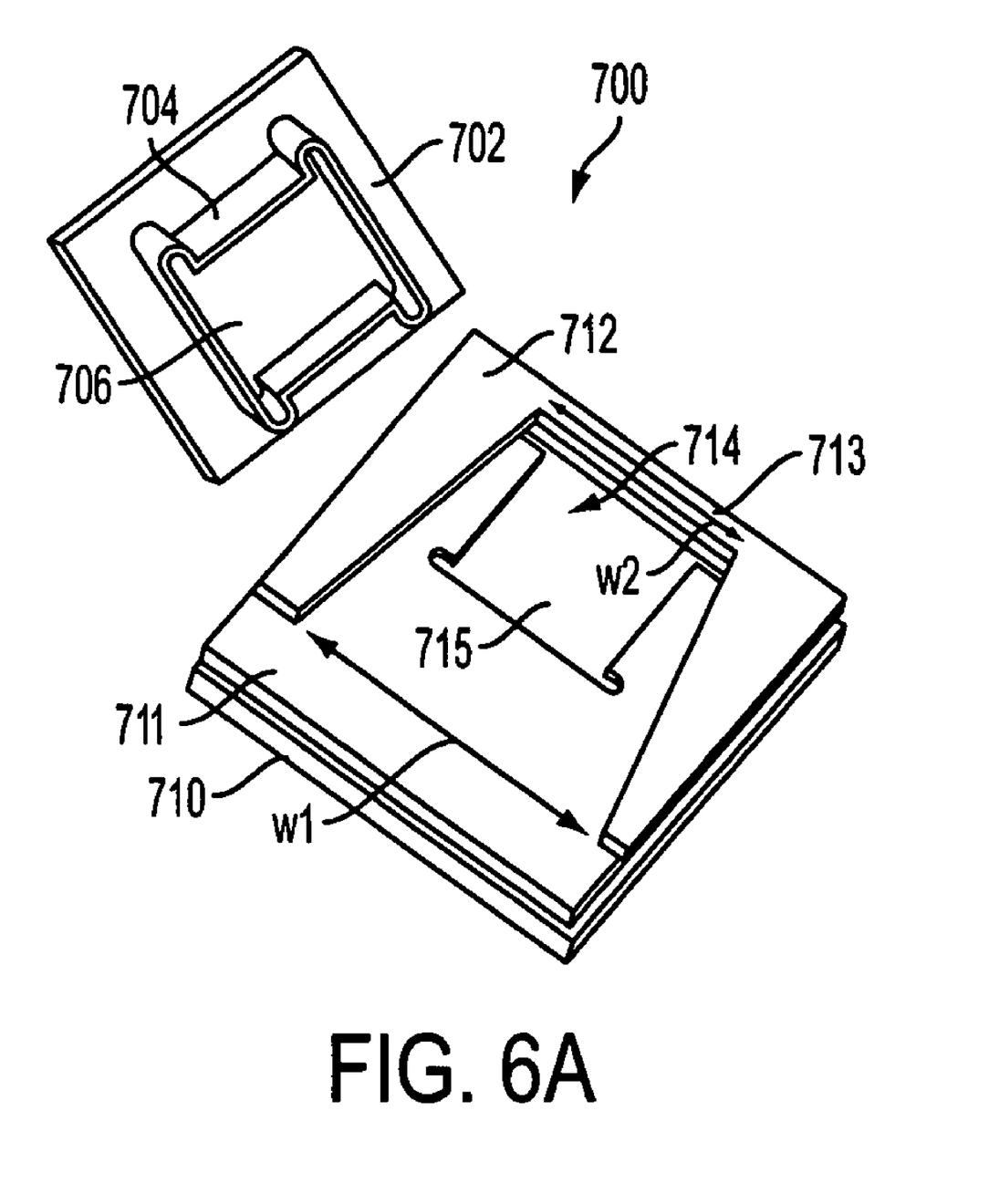
FIGS. 6A-C are exemplary diagrams of another embodiment of alignment structures according to the invention.

FIGS. 6A-C are exemplary diagrams of another embodiment of an alignment system according to the invention. As shown in FIG. 6A, an upper substrate 702 may be formed to include a first alignment structure 704 formed in a predetermined pattern. The first alignment structure 704 extends outward from a surface of the upper substrate 702. By extending outward, the alignment structure 704 forms an open area 706 within the boundaries of the first alignment structure 704. The microstructures may be positioned within the open area 706. The lower substrate 710 may include a first layer 711. The first layer 711 may be formed to include a second alignment structure 715 that is a cut-out area or a keyhole pattern within the first layer 711 and includes a shape that corresponds to the first alignment structure 704 on the upper substrate 702. The microstructures may be positioned within the second alignment structure 715.

Figure 6B:
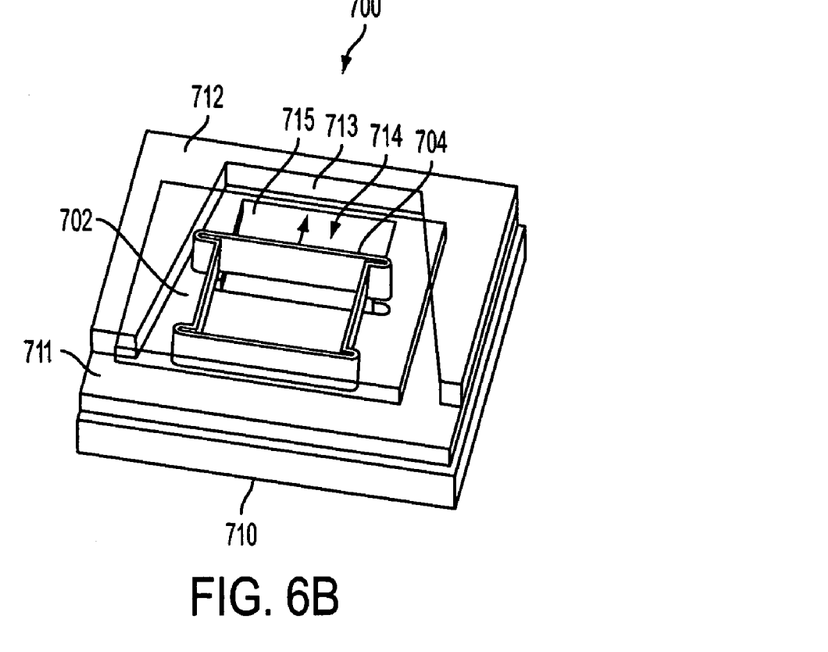

The lower substrate 710 may also include a second layer 712 formed on an outer area of the first layer 711. The second layer 712 may be formed so that one end of the second layer 712 is adjacent to one end of the alignment structure 715. This end of the second layer 712 may be formed with width w2. An opposite end of the second layer 712 from the adjacent end is formed as an open end so that the second layer 712 is formed in a U-shaped pattern. This end of the second layer 712 may be formed with width w1. Thus, the U-shaped second layer 712 may be formed as a tapered third alignment structure so that an opening area within the second layer 712 narrows in width from width w1 to width w2. As shown in FIG. 6B, both substrates 702 and 710 are brought into alignment by placing the upper substrate 702 onto the first layer 711 of the lower substrate 710 and sliding the upper substrate 702 backward. As the upper substrate 702 is slid backward, the tapered third alignment structure of the second layer 712 guides the upper substrate 702 into a desired position.

Figure 6C:
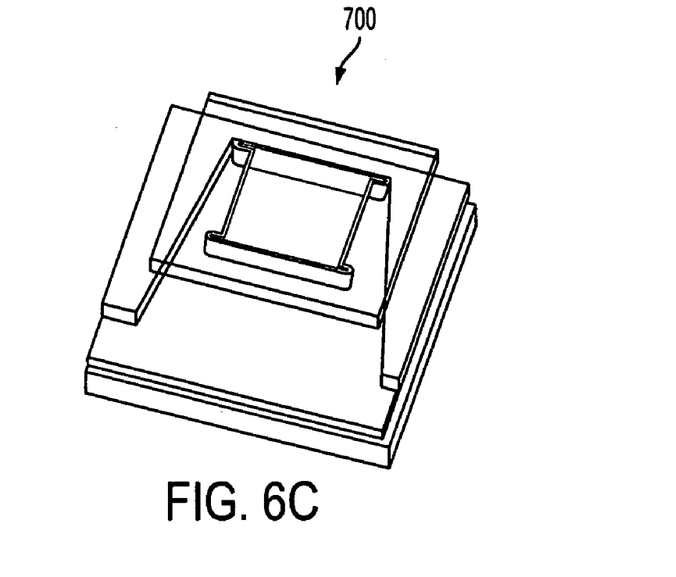

As shown in FIG. 6C, the alignment is complete when the first alignment structure 704 of the upper substrate 702 drops into the keyhole pattern of the second alignment structure 715. Once the alignment is complete, the microstructures located on the upper and lower substrates 702 and 710 may establish a connection or be positioned in close proximity to each other. The tolerances in the first layer 711 and the second layer 712 may be formed large enough to allow an easy fit of the first alignment structure 704 into the second alignment structure 715, but small enough to prevent damage on the upper and lower substrates 702 and 710. In various exemplary alternative embodiments, the upper and lower substrates 702 and 710 may include a fastener as discussed above to act as a latching device to lock the substrates in place.

Figure 7:
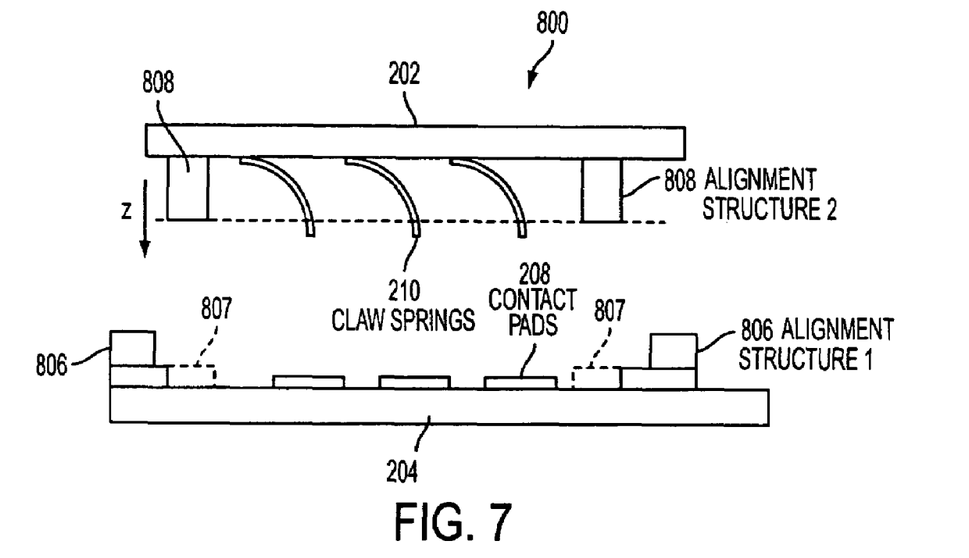
FIG. 7 is an exemplary diagram showing alignment of the substrates shown in FIG. 2.

FIG. 7 is an exemplary diagram showing alignment of the substrates shown in FIG. 2. The substrates 202 and 204 shown in FIG. 7 may be aligned using either rotational or linear alignment. As shown in FIG. 7, the upper substrate 202 includes the CLAW springs 210. However, the upper substrate 202 also includes first alignment structures 808. The lower substrate 204 includes the contact pads 208 and also includes second alignment structures 806. To align the substrates 202 and 204, the upper substrate 202 may be laterally aligned with the lower substrate 204 without causing the CLAW springs 210 to contact the contact pads 208. Once the upper and lower substrates 202 and 204 have been laterally aligned, the upper substrate 202 drops into final position with the first alignment structures 808 resting on the lower substrate 204 in a predetermine position 807. Only after the upper substrate 202 is in its final position do the CLAW springs establish contact with the contact pads 208 and are slightly compressed.

Figure 8:
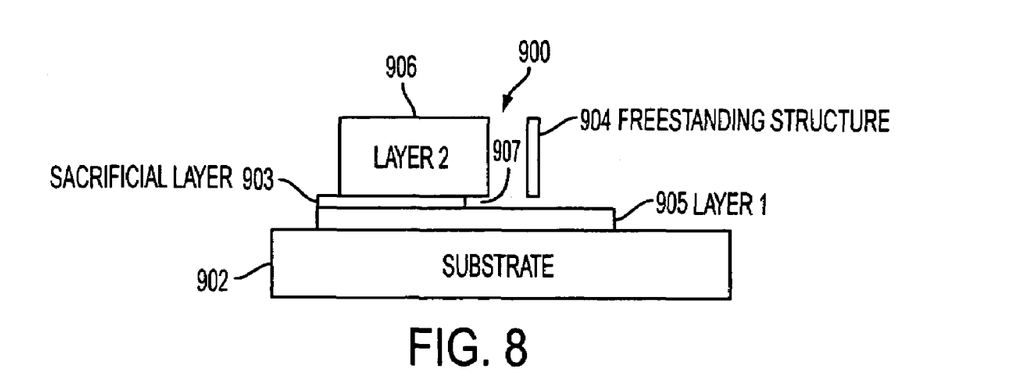
FIG. 8 is an exemplary diagram showing how an undercut area may be formed for a fastener.

FIG. 8 is an exemplary diagram showing how an undercut area may be formed for a fastener. The embodiment shown in FIG. 8 shows alignment structures formed on the lower substrate 902. The alignment structures may include a first layer 905 and a second layer 906 formed on the lower substrate 902. A sacrificial layer 903 is formed in between the first and second layers 905 and 906. The sacrificial layer 903 may be formed from a Polymethylglutarimide (PMGI) resist (from Microchem, Corp.), PIRL (from Brewer Sciences) or a metal such as Ti. The sacrificial layer 903 is partially removed in between the first and second layers 905 and 906 to form the undercut area 907. As discussed above, the undercut area 907 may facilitate movement of the fastener.

Figure 9:
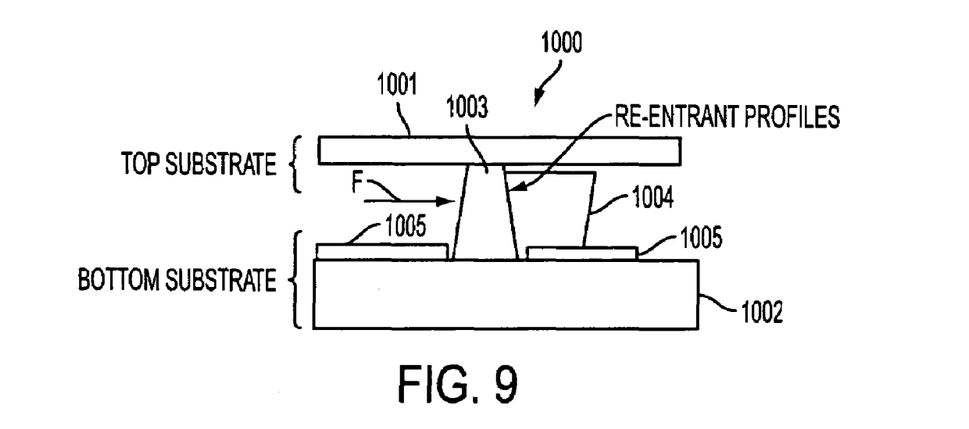
FIG. 9 is an exemplary diagram showing alignment structures according to another embodiment of the invention.

FIG. 9 is an exemplary diagram showing alignment structures according to another embodiment of the invention. As shown in FIG. 9, the alignment structures may be formed as a tilted or oblique structure to lock the substrates together after alignment. An upper substrate 1001 may include a first alignment structure 1003. A lower substrate 1002 may include a first layer 1005 as a second alignment structure and a third alignment structure 1004. The substrates 1001 and 1002 may include the microstructures discussed above. The second and third alignment structures 1003 and 1004 may be formed to be tilted or oblique in shaped with re-entrant profiles. This type of profile may be formed with a negative photoresist and exposure control or by employing oblique photoresist exposure. An applied lateral force F presses the first alignment structure 1003 of the upper substrate 1001 onto the third alignment structure 1004 of the lower substrate 1002 and prevents the substrates 1001 and 1002 from sliding apart. Once alignment is complete, the microstructures may establish a connection or be positioned in near proximity to each other.

It should be appreciated that SU-8 structures may be formed on the substrates in accordance with the embodiments of the invention. Any SU-8 structures formed with the embodiments of the invention may be coated after formation with a polymer to lower the friction during the alignment process. For example, the polymer may be a fluorocarbon. Moreover, other material may be used as the coating that reduce wear such as diamond-like-carbon or a plated metal (electro or electroless). The electroplating may include electroplating with SU-8 (or other high-aspect-ratio photopolymers) as the mold. The second layer 906 in FIG. 8 may be formed from plated metal to give it more strength. The LIGA process may be used for alignment structures requiring greater precision. The alignment structures (or a part of them) may also be etched into the substrate e.g. using deep reactive ion etching of silicon.

It should be appreciated that the embodiments according to the invention may be used with field emitter displays. The substrate with the field emitters has to be aligned to the second substrate, e.g. a counter-plate with the phosphor scintillation screen in order to display the correct colors. The embodiments of the invention may also be used with multi-layer microfluidic circuits. With these circuits, several wafers or substrates formed of silicon, glass, polymers, etc., with etched channels or through-holes have to be aligned with each other. Each wafer or substrate may be coated with a sensitive biological substance which requires a correct alignment on first contact. During the alignment process, it is imperative that the two wafers or substrates not rub against each other during the alignment process. It should be appreciated that after the wafers or substrates are aligned, they may be bonded by UV cure or laser tacking and then the wafer or substrate may be "diced up" in order to divide the wafer or substrate into smaller parts. Moreover, an adhesive may still be used with any of the embodiments without departing from the spirit and scope of the invention. If the wafers are divided into smaller parts, the adhesive may have to be applied between the two substrates prior to the division. It may be necessary for the adhesive to remain in a liquid form during the alignment process and then harden after alignment is complete.

While the invention has been described in conjunction with exemplary embodiments, these embodiments should be viewed as illustrative, not limiting. Various other modifications, substitutes, or the like are possible within the spirit and scope of the invention.

What is claimed is:

1. A self-aligning system for aligning substrates that each include microstructures, comprising:
    a first substrate that includes:
        a first surface,
        first microstructures disposed on the first surface, and
        one or more first alignment structures; and
    a second substrate that includes:
        a second surface,
        second microstructures disposed on the second surface, and
        a second alignment structure,
    the one or more first alignment structures substantially surrounding the first microstructures in plan view, each of the one or more first alignment structures extending away from the first surface, each of the one or more first alignment structures having side walls that are substantially perpendicular to a plane of the first surface, and each of the one or more first alignment structures having a distal end opposite to the first substrate, the one or more distal ends defining a single plane substantially parallel to the plane of the first surface,
    the second alignment structure including:
        a single planar surface substantially parallel to a plane of the second surface and having an opening substantially corresponding to the second microstructures in plan view,
        a single side wall substantially surrounding the planar surface and extending away from the planar surface to a side of the planar surface opposite from the second substrate, and
        one or more apertures in the planar surface each corresponding to one of the first alignment structures, the one or more apertures being positioned to simultaneously receive the first alignment structures when the first and second substrates are properly aligned,
    the side wall surrounding all of the one or more apertures and tangentially coinciding with an edge of each of the one or more apertures,
    wherein, when the first alignment structures are fully received in the apertures, the first and second microstructures are in contact with each other, the first and second microstructures otherwise not being in contact with each other, and
    the first and second microstructures can only be brought into contact by a movement substantially perpendicular to the planes of the first and second surfaces.

2. The self-aligning system for aligning substrates of claim 1, the one or more first alignment structures being formed on an edge of the first substrate and positioned in a circular shape in plan view, the second alignment structure being a circular shape, the first and second alignment structures permitting a rotational alignment so that at least one of the first and second substrates is rotated in relation to the other substrate.

3. The self-aligning system for aligning substrates of claim 1, the first substrate being formed of a transparent material, and the microstructures on the first substrate being one of at least opaque and transparent, and the second substrate being formed of a non-transparent material.

4. The self-aligning system for aligning substrates of claim 3, the first and second microstructures being aligned when the one or more first alignment structures and the second alignment structure lock into place.

5. The self-aligning system for aligning substrates of claim 2, the planar surface of the second alignment structure being formed in a substantially annular shape on an edge of the second substrate.

6. The self-aligning system for aligning substrates of claim 5, the side wall of the second alignment structure formed in substantially a circular shape and having one or more portions that each extend towards a centralized position of the second substrate, each portion formed so that its radius decreases in one of at least a clockwise and counter-clockwise direction until the portion tangentially coincides with an outer edge of a corresponding one of the one or more apertures.

7. The self-aligning system for aligning substrates of claim 4, the first microstructures and the second microstructures including electronic or micromechanical components and being one of at least in near proximity to each other and connected to each other.

8. The self-aligning system for aligning substrates of claim 1, the second substrate including a fastener so that the one or more first alignment structures are fastened to the second alignment structure when the first and second alignment structures lock into place.

9. The self-aligning system for aligning substrates of claim 1, one of at least the first and second alignment structures being a quadrilateral shape, the first and second substrates being restricted by the first and second alignment structures to move in a linear alignment so that the at least one of the first and second substrates is slid in a lateral or longitudinal direction in relation to the other substrate.

10. The self-aligning system for aligning substrates of claim 9, the second alignment structure including a first layer with an aperture that corresponds to a single first alignment structure and a second layer formed on an edge of the first layer and surrounding the aperture, an internal portion of second layer having an open end with a first width and a closed end with a second width so that the internal portion is tapered in shape.

11. The self-aligning system for aligning substrates of claim 1, wherein the apertures are holes formed in the planar surface that are completely bounded on all sides by the planar surface and the side wall.

12. A self-aligning system for aligning substrates, the system comprising:
  a first substrate that includes one or more first alignment structures and a first surface having first microstructures; and
  a second substrate that includes a second alignment structure and a second surface having second microstructures, the second alignment structure including:
    a planar surface having a single side wall substantially perpendicular to a plane of the second substrate, the side wall surrounding at least a portion of the planar surface and extending from the planar surface in a direction away from the second substrate, and
    one or more apertures, each aperture corresponding to, and configured to receive, one of the first alignment structures, the first and second substrates being aligned when the first alignment structures and the apertures are aligned in plan view,
  the side wall surrounding the apertures and tangentially coinciding with an edge of each of the apertures in plan view,
  the first and second micro structures not contacting each other when distal ends of the first alignment structures opposite from the first substrate are in contact with the planar surface and the first and second substrates are misaligned,
  the first and second microstructures are in contact only when the first alignment structures are received into the apertures,
  wherein the first and second microstructures come into contact only by a movement substantially perpendicular to planes of the first and second surfaces.

13. The system according to claim 12, the second substrate further including one or more first stopping structures that prevent continuation of movement of the first and second substrates relative to each other while the first alignment structures and the planar surface are in contact and when the first alignment structures come into contact with the first stopping structures,
  wherein the first alignment structures are aligned with the apertures.

14. The system according to claim 12, the second substrate further including one or more second stopping structures that prevent continuation of movement of the first and second substrates towards each other when the first alignment structures are within the apertures.

15. The system according to claim 14, wherein, when the second stopping structures and the first alignment structures are in contact, the first and second microstructures are in contact.

16. The system according to claim 12, wherein
  the first alignment structures have a substantially columnar shape, and
  the side wall has a substantially circular shape.

17. The system according to claim 12, wherein the side wall constrains the second movement to be a substantially linear movement.

18. The system according to claim 12, wherein
  the first alignment structures comprise a single structure having a non-circular cross-section;
  the side wall includes an internal portion having an open end with a first width and a closed end with a second width so that the internal portion is tapered in shape; and
  the second alignment structure includes a single aperture corresponding to the non-circular cross-section.

19. The system according to claim 12, wherein
  at least one of the first alignment structures, the second alignment structure, and the side wall is coated with a friction-reducing layer.

20. A self-aligning system for aligning substrates that include microstructures, comprising:
  a first substrate that includes first alignment structures and a first surface having first microstructures, the first alignment structures extending in a direction substantially perpendicular to the first surface and being arranged in a substantially circular pattern on the first substrate in plan view;
  a second substrate that includes a second alignment structure and a second surface having second microstructures, the second alignment structure including:
    a single planar surface substantially parallel to a plane of the second surface, the planar surface being substantially annular in shape in plan view, the planar surface having apertures, each aperture configured to receive one of the first alignment structures, and
    a side wall substantially perpendicular to the second surface, the side wall surrounding the planar surface and all of the apertures in plan view and extending away from the planar surface on a side of the planar surface opposite from the second substrate, the side wall tangentially coinciding with an edge of each of the apertures,
  each aperture being a hole in the planar surface completely surrounded by the planar surface and/or the side wall, the apertures being positioned to simultaneously receive the first alignment structures,
  wherein the first and second microstructures contact each other only when the first alignment structures are fully received in the apertures,
  the first alignment structures having side walls substantially perpendicular to a plane of the first surface and the apertures having side walls substantially perpendicular to a plane of the second surface so that the first and second microstructures are able to come into contact only by a movement in a direction substantially perpendicular to the first and second surfaces.

* * * * *